United States Patent [19]

Setoya

[11] Patent Number: 4,607,204

[45] Date of Patent: Aug. 19, 1986

[54] FIVE-PHASE STEPPING MOTOR

[75] Inventor: Noboru Setoya, Kuzuhanakamachi, Japan

[73] Assignee: Mycom Kabushiki Kaisha, Kyoto, Japan

[21] Appl. No.: 758,993

[22] Filed: Jul. 25, 1985

[30] Foreign Application Priority Data

Sep. 19, 1984 [JP] Japan ............................... 59-197387

[51] Int. Cl.[4] ............................................... H02P 8/00
[52] U.S. Cl. ...................................... 318/696; 318/685
[58] Field of Search ................................. 318/696, 685

[56] References Cited

U.S. PATENT DOCUMENTS 3,842,332 10/1974 Heine et al. ......................... 318/696

Primary Examiner—William M. Shoop, Jr.
Assistant Examiner—Saul M. Bergmann
Attorney, Agent, or Firm—Armstrong, Nikaido, Marmelstein & Kubovcik

[57] ABSTRACT

A five (5) phase stepping motor including a rotor rotated by electromagnetic field produced in a stator having coils, the first to the fifth inclusive, wound thereon and excited by driving signals in five phases while individually responding to each of these signals, in which said coils are wound on the stator so that a groups of the 1st, 3rd, and 5th coils and the other group of the 2nd and 4th coils are opposite to each other in phase and all the coils are connected to each other at one end, with the other ends each serving as an input terminal.

1 Claim, 12 Drawing Figures

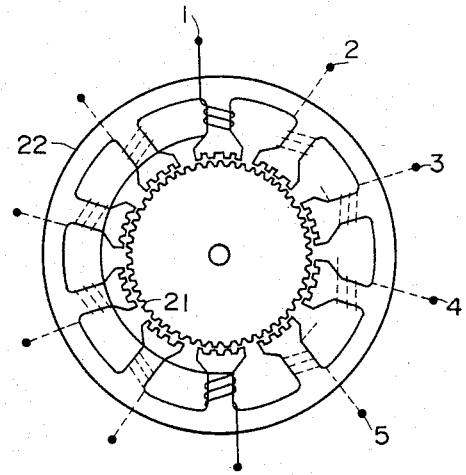

FIVE-PHASE STEPPING MOTOR

BACKGROUND OF THE INVENTION

1. Field of the Invention

This invention relates to a five(5)-phase stepping motor driven by driving signals in five phases.

2. Description of the Prior Art

As conventional circuits for driving the 5-phase stepping motor, those of standard drive, pentagon drive, and star drive type have been proposed and are now in use. Because of difficulties in performance of half-step driving depending on 4- or 5-phase excitation by the pentagon and star drives, the standard drive is mainly used for this performance.

FIG. 1 is a diagram showing the standard drive for driving a conventional 5-phase stepping motor.

In FIG. 1, the reference numerals 1 to 5 indicate five coils of five phases A to E, respectively, wound around stator poles of the 5-phase stepping motor. The coils 1 to 5 of respective phases are driven in a way that some are driven in the same phase and others in the reverse phase. The power source 7 impacts exciting current to each of coils of all phases.

As apparent from this diagram, such a 5-phase stepping motor as above is provided with 10 input terminals corresponding to five coils, thereby requiring complicated wiring and hands. In a circuit for driving the 5-phase stepping motor, four transistors are used for coils of respective phases and, therefore, twenty transistors in total must be prepared for composing output steps. As a result, there arise such problems as an increase in heat generation in output steps, increase in the size of the output step, and complexity of control circuit for controlling the output step.

A structure in which coils 1 to 5 of respective phases are excited in parallel makes it necessary to adapt the power source 7 to supply electric current in quantity four to five times larger than that of the rated current (current of allowable quantity to be flowed into coils of all phases) for the motor correspondingly to 4–5 phase excitation. Accordingly, the stepping motor of such structure as above requires a power source of large current capacity.

SUMMARY OF THE INVENTION

An object of this invention is to provide a 5-phase stepping motor permitting simplification of wiring and less consumption of electric current.

The present invention is embodied by a 5-phase stepping motor which includes a rotor rotated by electromagnetic field produced in a stator having coils, the first to the fifth inclusive, wound thereon and excited by driving signals in five phases while individually responding to each of these signals, and is characterized by a structure that coils, the 1st to the 5th, are wound on the stator so that a group of the 1st, 3rd, and 5th coils and the other group of the 2nd and 4th coils are opposite to each other in phase, all the coils being connected to each other at one end, with the other ends thereof serving as an input terminal.

BRIEF DESCRIPTION OF THE DRAWINGS

FIG. 3 is a schematic view of the structure of the above said 5-phase stepping motor embodying the invention;

FIG. 4 is a diagram showing waveforms and directions of excitation to be produced in coils of respective phases 1 to 5;

DESCRIPTION OF THE PREFERRED EMBODIMENTS

Figure 2:
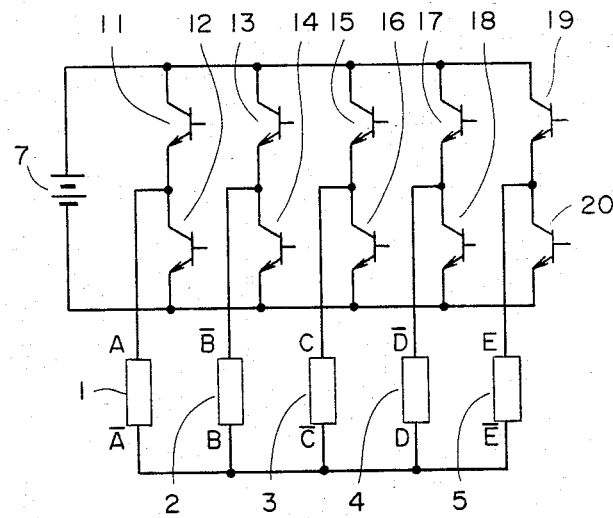
FIG. 2 is a diagram of a driving circuit for driving a 5-phase stepping motor as an embodiment of this invention.

FIG. 2 is a diagram of a driving circuit for driving a 5-phase stepping motor as an embodiment of this invention.

Figure 1:
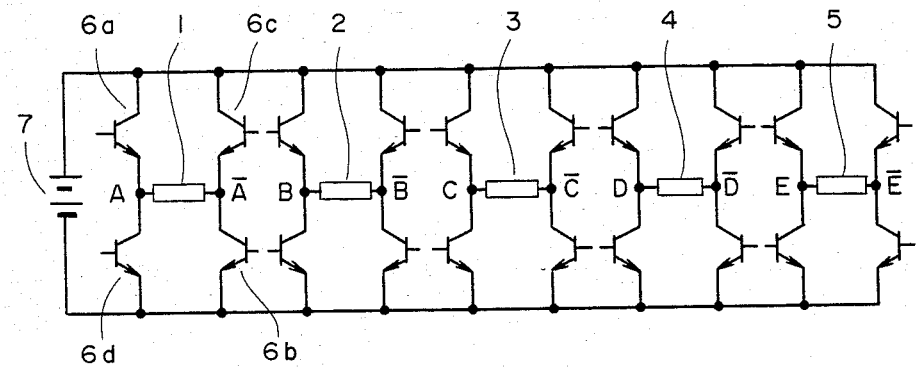
FIG. 1 is a circuit diagram of the standard drive for driving a conventional 5-phase stepping motor.

In FIG. 2, component elements corresponding to those in FIG. 1 are indicated by the same reference figures as those in FIG. 1. The 5-phase stepping motor is provided with coils 1 to 5 of phases A to H, respectively, and coils 1 to 5 are wound on the stator 22 as shown in FIG. 3 that will be described later, so that a group of the coils 1 of phase A, 3 of C, and 5 of E is opposite in phase to the other group of coils 2 of phase B and 4 of D. The coils 1 to 5 are connected to each other at one end, with the other ends each serving as an input terminal of the 5-phase stepping motor.

Reference numerals 11 to 20 inclusive indicate transistors for exciting respective phases. Emitters of the transistors 11, 13, 15, 17, and 19 are connected to collectors of the other transistors 12, 14, 16, 18, and 20, respectively. Pairs of transistors 11 and 12, 13 and 14, 15 and 16, 17 and 18, and 19 and 20 are connected in parallel to the power source 7. The other ends of coils 1 of phase A to 5 of E are connected to connections of paired transistors 11 and 12, 13 and 14, 15 and 16, 17 and 18, and 19 and 20, respectively.

The action of the driving circuit composed as above will be described.

FIG. 3 is a view schematically illustrating the structure of a 5-phase stepping motor embodying the invention.

A rotor 21 comprises 50 teeth. A stator 22 consists of 10 main poles, and teeth of poles are arranged so that teeth of one main pole are distance from corresponding teeth of the adjoining main pole by a distance one-tenths (1/10) of tooth-pitch of the rotor 21 longer then pitch of main pole. Coils on opposing poles are wound in such manner that these two main poles have the same polarity (N or S), whereby five phases A to E are provided by coils 1 of phase A to 5 of phase E inclusive. These coils 1 to 5 of five phases are connected to each other as shown in FIG. 2.

FIG. 4 is a view for description of current waveforms and excitation directions. Excitation directions are assumed as positive (+) and negative (−) when current flows, for example, from A to $\overline{A}$ and from $\overline{A}$ to A, respectively, for the coils 1 of phase A, 3 of C, and 5 of E, whereas, for the coils 2 of phase B and 4 of D which are reverse in phase to the coils 1, 3, and 5 of respective phases, the directions are assumed as positive (+) and negative (−) when current flows from $\overline{B}$ to B and from B to $\overline{B}$, respectively.

Numerals from 0 to 19 in FIG. 4 indicate sequential states (steps) of phase excitation.

For example, at the step 0, transistors 11, 14, 15, 18, and 19 are turned on whereas the others off. Therefore, current supplied from the power source 7 is fed to the coils 1 of phase 3, 3 of C, and 5 of E and, further, to the coils 2 of phase B and 4 of D. As a result, a group of coils 1 of A, 3 of C, and 5 of E and the other group of coils 2 of B and 4 of D are excited in parallel in the positive (+) direction and negative (−) direction, respectively, where both groups are connected to each other in series. When a value I is assumed as the rated quantity of current of the motor, the power source satisfies the purpose with the supply of exciting current of 2×I. Therefore, as indicated by current waveforms at the step 0, current of 2I/3 (+ direction) is supplied to each of coils 1 of phase A, 3 of C, and 5 of E whereas current of I (− direction) to each of coils 2 of B and 4 of D.

FIGS. 5 and vector diagrams showing torque generated in the coils 1 to 5 of various phases at the abovesaid steps. In these drawings, arrow marks ↑ and ⇂ indicate torque in each phase and resultant torque, respectively. A torque in each phase of the 5-phase stepping motor may be regarded as varying at an electrical angle $\theta_e$ of 36°. This electrical angle is converted into a mechanical angle $\theta_m$ as:

$$\theta_m = \text{angular tooth-pitch of the ratio}/10$$
$$= 7.2/10 = 0.72°$$

Figure 5D:
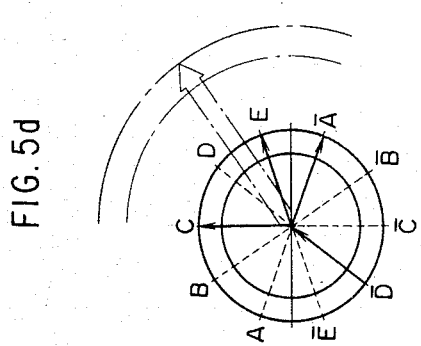
FIGS. 5(a) to 5(g) are vector diagrams each showing torque generated in each phase at each step described above; and, FIG. 6 is a view illustrating loci of resultant torque vectors.
Figure 5C:
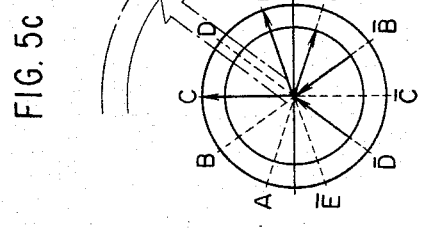
Figure 5B:
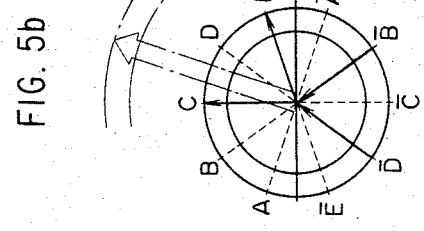
Figure 5A:
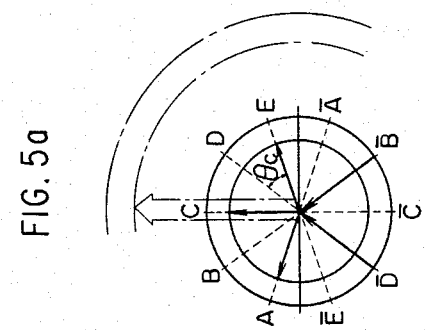
Figure 5G:
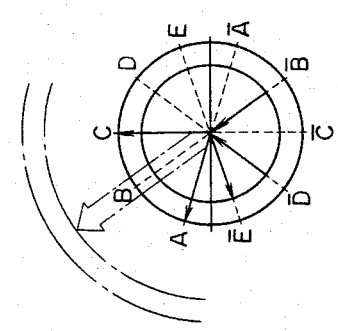
Figure 5F:
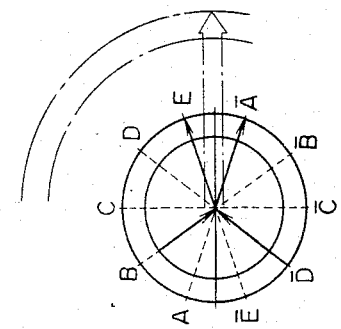
Figure 5E:
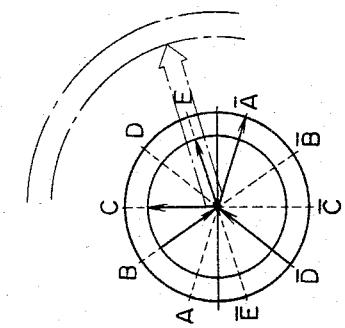

FIG. 5(a) is a diagram showing a vector at the step 0. The coils 1 to 5 are excited as described above in the stepping motor and rhe direction of the resultant vector coincides with that of the vector in the phase C.

The state of vectors at the step 1 will be described. At this step, the transistor 11 which has been powered at the step 0 is turned off, thereby providing 4-phase excitation for the stepping motor. Current waveforms are as shown in FIG. 4, in which values of current quantity tkae I (+ direction) in the coils 3 of phase C and 5 of E whereas I (− direction) in the coils 2 of B and 4 of D. The resultant torque, as shown in FIG. 5(b), acts in the direction passing through the midpoint between phases C and D. The rotor, therefore, turns clockwise by 0.36° (half step).

At the step 2, as shown in FIG. 5(c), the motor is in the state of 5-phase excitation. Current waves assume such forms as shown in the drawing and the value of current quantity is I (+ direction) in each of coils 1 of phase A, 2 of B, and 4 of D. The resultant torque acts in the same direction as that of torque vector in the phase D. The rotor turns by 0.72° relative to the position at the step 0.

Afterwards, the direction of resultant torque varies in turn as shown in FIGS. 5(d) to 5(g) as current in flowed through phases in such a way as shown at steps 0 to 19 in FIG. 4. With the variation in the direction of resultant torque, the rotor turns and, with one complete rotation of the resultant torque, the rotor turns by 7.2°.

Figure 6:
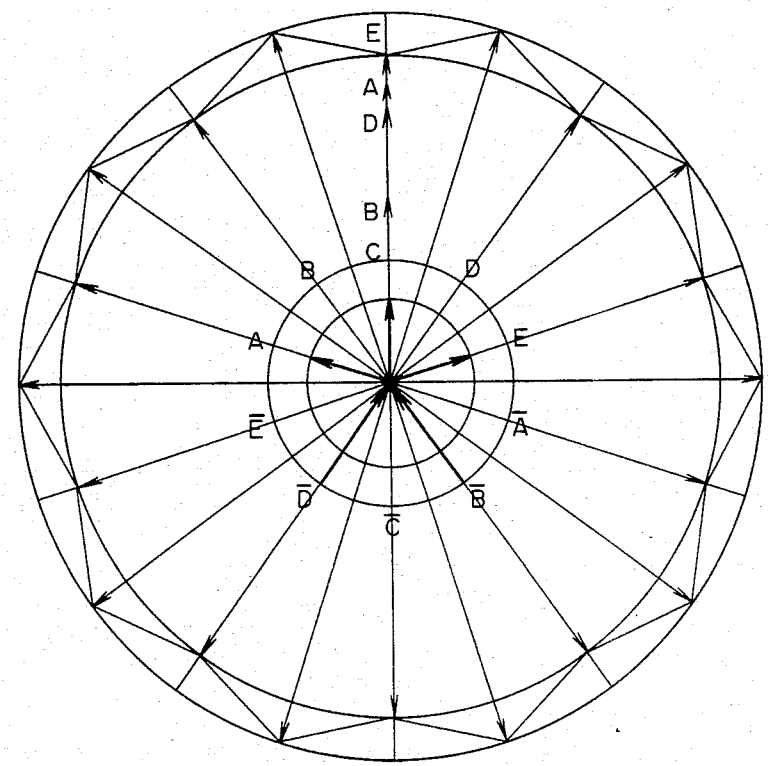

FIG. 6 is a diagram showing loci of resultant vectors. As apparent from this drawing, a magnitude of the vector produced at the time of 5-phase excitation is slightly smaller than that at 4-phase excitation. However, a difference between magnitudes of vectors as observed in this diagram is as small as non-influential on the prectical use. Such a sifference can be reduced by supplying power source current in quantity somewhat larger at 5-phase excitation than that at 4-phase excitation.

A small number of input terminals in the 5-phase stepping motor according to this invention enables reduction in the man-hour rate for wiring and in happenings of wrong wiring. Moreover, even if any wrong wiring is caused, the driving circuit is not overloaded.

I claim:

1. A five (5)-phase stepping motor, which includes a rotor rotated by an electromagnetic field produced in a stator having coils, said coils being first to fifth inclusive, and wound thereon and excited by driving signals in five phases while individually responding to each of these signals, characterized by a structure that coils, the 1st to the 5th, are wound on the stator so that a group of the 1st, 3rd, and 5th coils and the other group of the 2nd and 4th coils are opposite to each other in phase and all the coils are connected to each other at one end, with the other ends each serving as an input terminal.

* * * * *